(12) United States Patent
Ho et al.

(10) Patent No.: US 7,224,531 B2
(45) Date of Patent: May 29, 2007

(54) OPTICAL PRISM ASSEMBLY

(75) Inventors: Fang-Chuan Ho, Taoyuan Hsien (TW); June-Jei Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 101 days.

(21) Appl. No.: 11/113,229

(22) Filed: Apr. 25, 2005

(65) Prior Publication Data

US 2006/0007401 A1 Jan. 12, 2006

(30) Foreign Application Priority Data

Jul. 9, 2004 (TW) .............................. 93120591 A

(51) Int. Cl.
*G02B 27/14* (2006.01)
*G02B 27/12* (2006.01)

(52) U.S. Cl. ........................ 359/634; 359/640
(58) Field of Classification Search ............... 353/33, 353/81; 359/634, 639, 640
See application file for complete search history.

(56) References Cited

U.S. PATENT DOCUMENTS

| | | | | |
|---|---|---|---|---|
| 6,019,474 A | * | 2/2000 | Doany et al. ................. | 353/33 |
| 6,327,092 B1 | * | 12/2001 | Okuyama ................... | 359/634 |
| 6,517,209 B2 | * | 2/2003 | Huang ......................... | 353/81 |

* cited by examiner

*Primary Examiner*—David N. Spector
(74) *Attorney, Agent, or Firm*—Birch, Stewart, Kolasch & Birch, LLP

(57) ABSTRACT

An optical prism assembly. The optical prism assembly includes an isosceles triangular prism and a plurality of prism blocks. The isosceles triangular prism comprises a base angle, between 30° and 45°. A first prism block and a second prism block are connected to two bounding surfaces of the isosceles triangular prism having equal lengths. A third prism block is connected between the first prism block and the second prism block. A first dichroic filter and a second dichroic filter are formed on the isosceles triangular prism and two adjacent bounding surfaces of each prism blocks, such that the isosceles triangular prism is combined with each prism block to form a first filter continuous plane and a second filter continuous plane.

22 Claims, 6 Drawing Sheets

OPTICAL PRISM ASSEMBLY

BACKGROUND

The invention relates to an optical prism assembly, and in particular to an optical prism assembly for a digital light processing (DLP) projection system.

FIG. 1 is a schematic view of a conventional digital light processing (DLP) projection system disclosed by U.S. Pat. No. 5,826,959, utilizing a cross dichroic prism emitting synthesized light of red (R), blue (B), and green (G) for projection. As shown in FIG. 1, the conventional DLP projection system comprises a cross dichroic prism 100, three polarization beam splitters 102, 104, and 106, and three spatial light modulators (SLM) 108, 110, and 112. When images are produced via the combination of the cross dichroic prism 100 and the spatial light modulators 108, 110, and 112, each spatial light modulator 102, 104, or 106 operates on one of the red, green, and blue light components. The spatial light modulators 108, 110, and 112 are referred to as three liquid crystal (LC) light valves 108, 110, and 112, respectively. The polarization beam splitters 102, 104, and 106 are disposed between the liquid crystal light valves 108, 110, and 112 and the cross dichroic prism 100, respectively. Two dichroic filters or mirrors 120 and 122 intersected in the cross dichroic prism 100 can reflect only blue or red light components and allow other colors therethrough. Thus, when the red, green, and blue light components pass through the polarization beam splitters 102, 104, and 106, respectively, reflected by the liquid crystal light valves 108, 110, and 112, the cross dichroic prism 100 combines the red, green, and blue light components and transmits the synthesized light for projection in a perpendicular direction.

The conventional design, however, has the following disadvantages. Each colored light has a large incident angle of 45° inclined at the dichroic filters 120 and 122. If the incident angle is too large, the polarization light spectrum through the dichroic filters is shifted. The overall efficiency of colored light in the prism assembly is reduced, accordingly, reducing color purity and brightness.

SUMMARY

Embodiments of the invention provide an optical prism assembly to eliminate the shortcomings of the conventional optical prism assembly.

Also provided is an optical prism assembly comprising an isosceles triangular prism and a plurality of prism blocks. The isosceles triangular prism comprises a first bounding surface and a second bounding surface, having equal lengths. An angle formed between the first bounding surface and a third bounding surface adjacent thereto is greater than 30° and less than 45°. The prism blocks comprise a first prism block, connected to the first bounding surface, a second prism block, connected to the second bounding surface, and a third prism block, connected between the first prism block and the second prism block. A first filter and a second filter are formed on the isosceles triangular prism and two adjacent bounding surfaces of each prism block, respectively. The isosceles triangular prism is combined with each prism block to form a first filter continuous plane and a second filter continuous plane intersecting at an angle not equal to 90°.

By utilizing an isosceles triangular prism as a basic element of the present invention with two intersecting dichroic filter planes, a simple combination of prism blocks ensures the accordant light paths of each colored light in the optical prism assembly with each color perpendicularly entering and passing through the prism assembly.

Moreover, the invention limits the size of the base angle of the isosceles triangular prism to modulate the angle between two dichroic filter planes such that the incident angle of the colored light on the dichroic filter can be adjusted. Thus, the base angle $\beta$ of the isosceles triangular prism is limited between 30° and 45° such that the angle between the dichroic filter planes can be reduced, thereby reducing the incident angle of the colored light on the dichroic filter, preventing shifts in polarization light spectrum of the dichroic filters. Thus, image accuracy and color after combination are enhanced.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the subsequent detailed description and the accompanying drawings, which are given by way of illustration only, and thus are not limitative of the present invention, and wherein.

DETAILED DESCRIPTION

Figure 1:
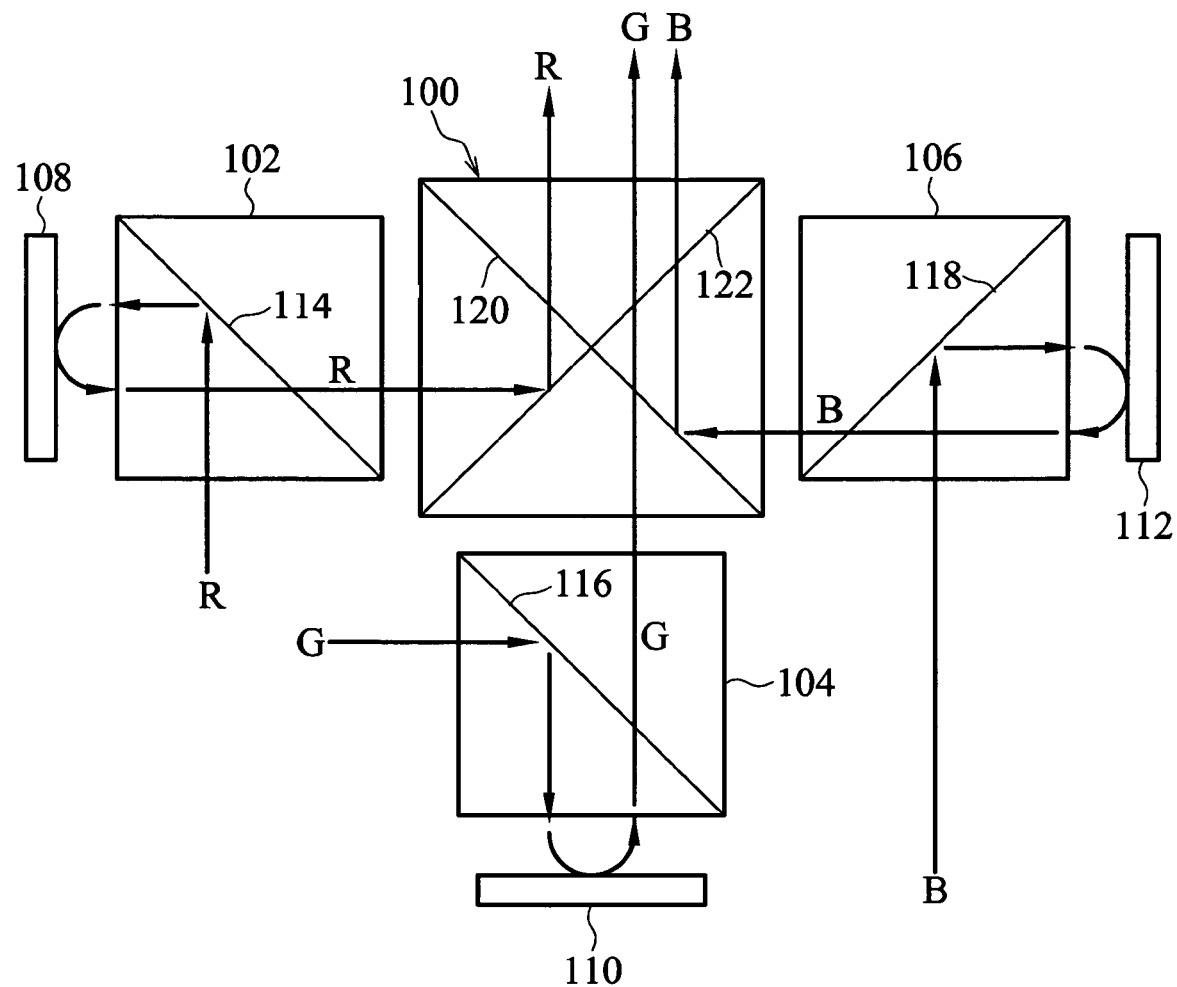
FIG. 1 is a schematic view of a conventional cross dichroic prism of a digital light processing projection system.
Figure 2:
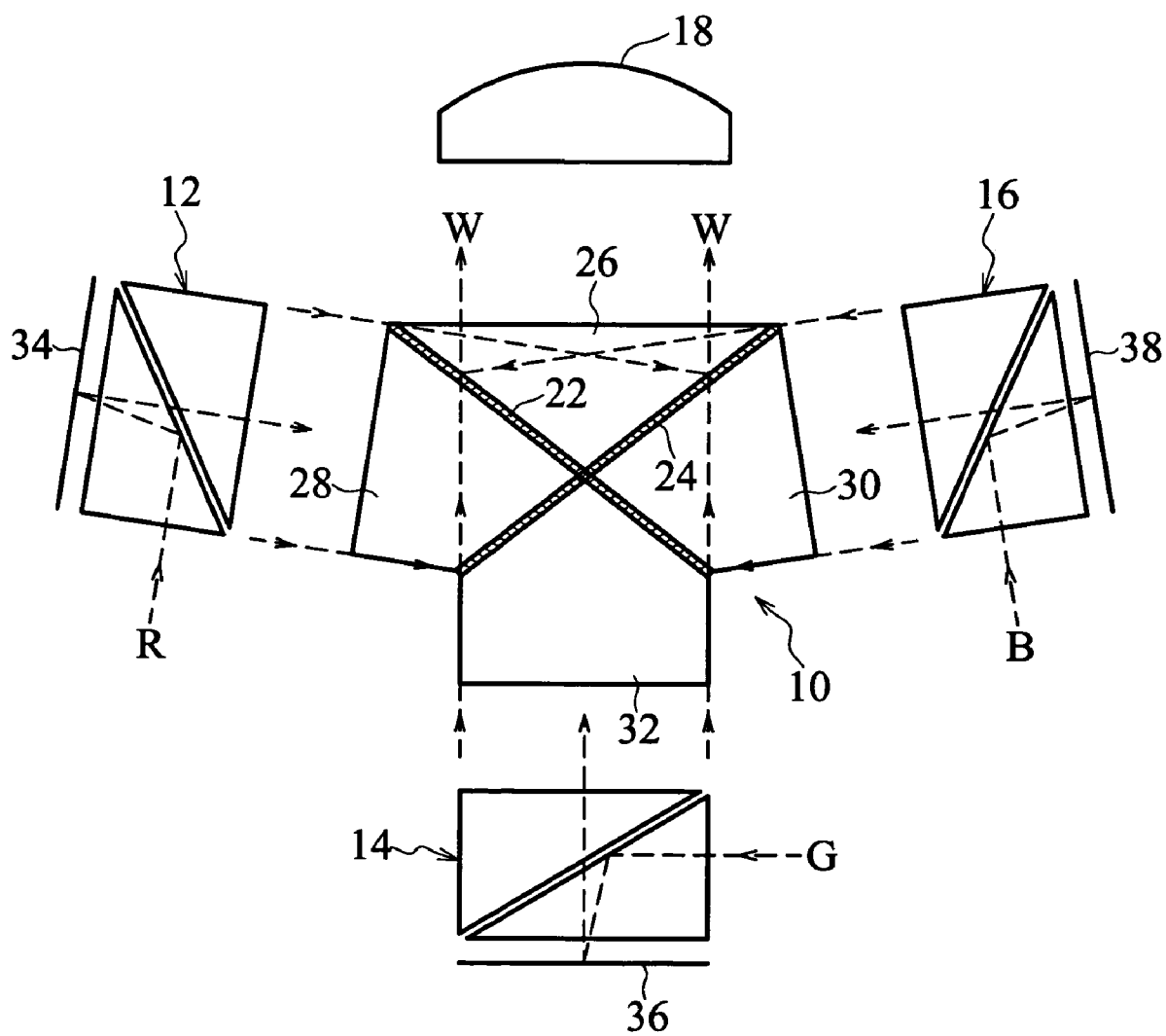
FIG. 2 is a plan view of an optical prism assembly of an embodiment of the invention.

FIG. 2 is a plan view of an optical prism assembly 10 of an embodiment of the invention. The optical prism assembly 10 is utilized in a digital light processing (DLP) projection system with the combination of three DLP panels 34, 36, and 38 for producing images. A plurality of micro-reflective mirrors are formed on the DLP panels 34, 36, and 38. The inclined angles of the mirrors are modulated such that when light transmitting through the projection system forms a light shade, that deflecting away from the optical axis of the projection system forms a dark shade. The digital light processing panels 34, 36, and 38 can modulate three colors, red (R), green (G), and blue (B), respectively.

Total internal reflection prisms 12, 14, and 16 are disposed between the optical prism assembly 10 and the digital light processing panels 34, 36, and 38, respectively. The red, blue, and green components from different directions are guided to corresponding digital light processing panels 34, 36, and 38 for reflection to the optical prism assembly 10. Lastly, the optical prism assembly 10 can combine each color from the digital light processing panels 34, 36, and 38 to a projective lens 18 for producing images.

Figure 3:
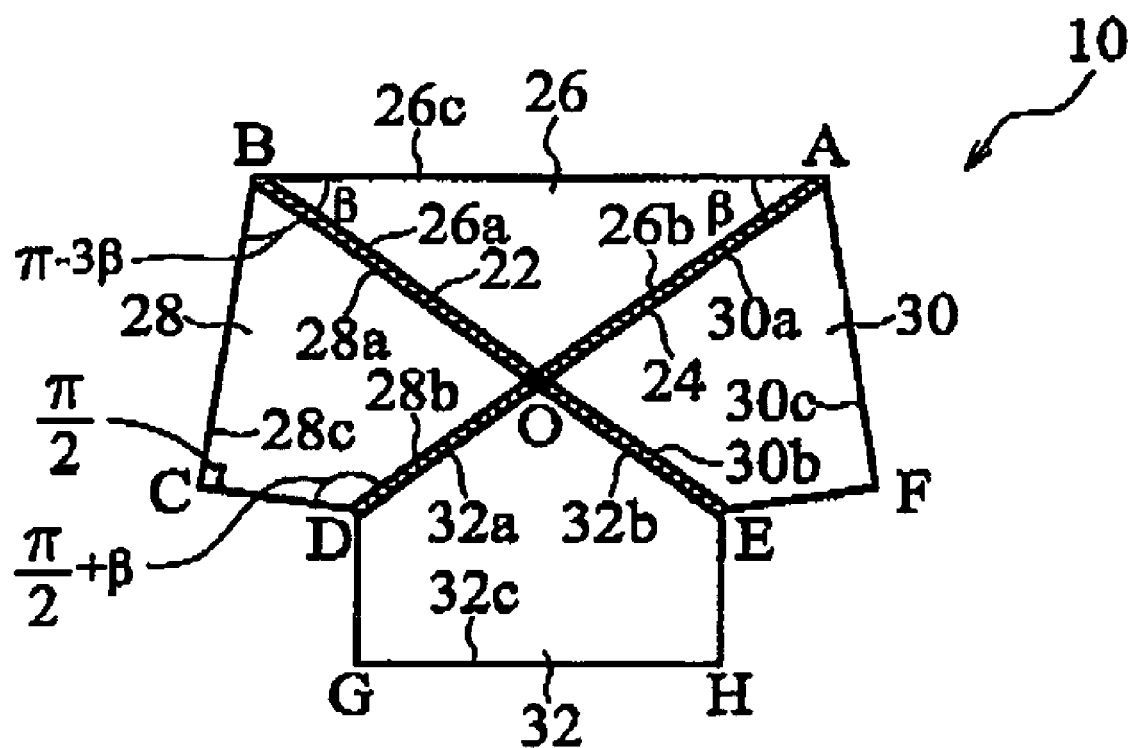
FIG. 3 is a schematic view showing connection and angles of the prism elements of the optical prism assembly.

FIG. 3 is a schematic view showing connection and angles of the prism elements of the optical prism assembly 10. The optical prism assembly 10 comprises an isosceles triangular prism 26 and a plurality of prism blocks 28, 30, and 32. The prism blocks 28 and 30 comprise quadrangular prisms. The prism block 32 comprises a pentagonal prism.

Figure 4A:
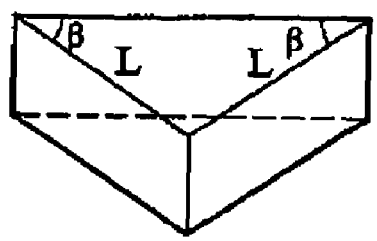
FIGS. 4A, 4B and 4C are schematic views of different prism elements of the invention.
Figure 4B:
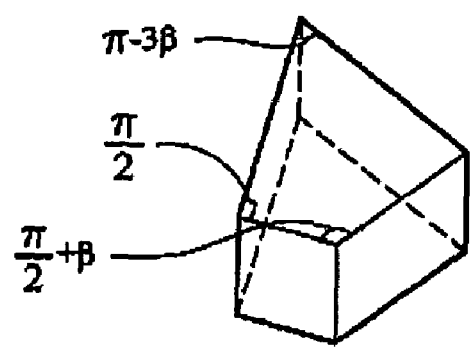
Figure 4C:
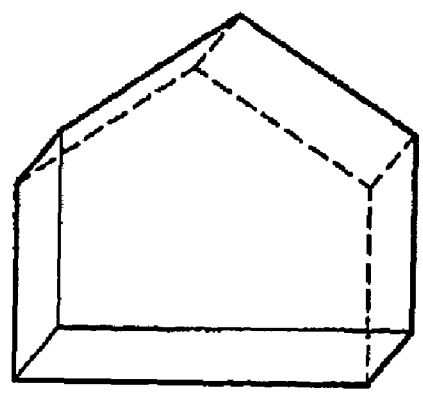

FIGS. 4A, 4B and 4C are schematic three-dimensional views of different prism elements such as a triangular prism, a quadrangular prism, and a pentagonal prism, respectively. As shown in FIG. 4, the "isosceles triangular prism" is defined as a 3D prism comprising a pair of horizontal isosceles triangular planes, parallel to each other, and three vertical planes perpendicular to the horizontal planes. Thus, the isosceles triangular prism comprises two equidistant vertical planes L and two identical base angles b. The "quadrangular prism" is also a 3D prism comprising a pair of parallel horizontal planes and four vertical planes. Moreover, light enters and passes through the vertical plane of each prism. Since the drawings are plan views, each vertical plane is referred to as a "bounding surface".

Referring to FIG. 3 again, the isosceles triangular prism 26 comprises two bounding surfaces 26a and 26b having the same length and an angle β between a base 26c and one of the bounding surfaces 26a and 26b. The angle β is between 30° and 45°, for example, 40°. A bounding surface 28a of the prism block 28 is connected to the bounding surface 26a of the isosceles triangular prism 26. Another bounding surface 28b adjacent to the bounding surface 28a is located on the same plane as the bounding surface 26b.

In the embodiment, the prism blocks 30 and 28 are quadrangular prisms having the same shape and size. They are connected to the isosceles triangular prism 26 in the same manner. That is, a bounding surface 30 of the prism block 30 is connected to the bounding surface 26b of the isosceles triangular prism 26. Another bounding surface 30b adjacent to the bounding surface 30a is located on the same plane as the bounding surface 26a.

Two bounding surfaces 32a and 32b of the prism block 32 are connected to the bounding surface 28b and bounding surface 30b, respectively. The prism blocks 28, 30, and 32 facing to the bounding surface of the DLP panel are parallel to the planes of the DLP panels.

With the prism structure described above, a continuous plane coated with a dichroic filter 22 is formed between the bounding surfaces 26a and 28a and the bounding surfaces 30b and 32b. Also, another continuous plane coated with a dichroic filter 24 is formed between the bounding surfaces 26b and 30a and the bounding surfaces 28b and 32a. The dichroic filters 22 and 24 are coated with interfering film filtering specific color bands. The formation of the dichroic filters in the optical prism assembly is not limited in the invention. For example, the dichroic filter can be formed by various numbers of layers of interfering coating to filter red and blue components between two adjacent bounding surfaces of the isosceles triangular prism and the first, second, and third prism blocks. The described prism elements are combined to form two intersecting dichroic filter continuous planes.

Since the isosceles triangular prism 26 has two equal sides 26a and 26b intersecting with a base 26c to form two base angles, defined as β, the angle between two continuous planes of the dichroic filters 22 and 24 is defined as 2β, and the acute angle is between 60° and 90°.

The angle arrangement of the optical prism assembly 10 is shown in FIGS. 2 and 3. The prism blocks are arranged such that after the light is reflected by the digital light processing panels 34, 36, and 38. the light enters the bounding surface of the optical prism assembly 10 at a perpendicular angle, as shown in FIG. 2. After the light is combined, the combined light W is directly emitted from the base 26c of the isosceles triangular prism 26 at a perpendicular angle. As shown in FIG. 3, when the base angle DABO=b, the continuous planes of the dichroic filters 22 and 24 form an acute angle DBOD=2β, and when the angle ∠BCD is obtained to be π/2, the bounding surface and the digital light processing panel are parallel, the angle ∠CBQ= (π−3β), and ∠CDO=(π/2+β).

Figure 5:
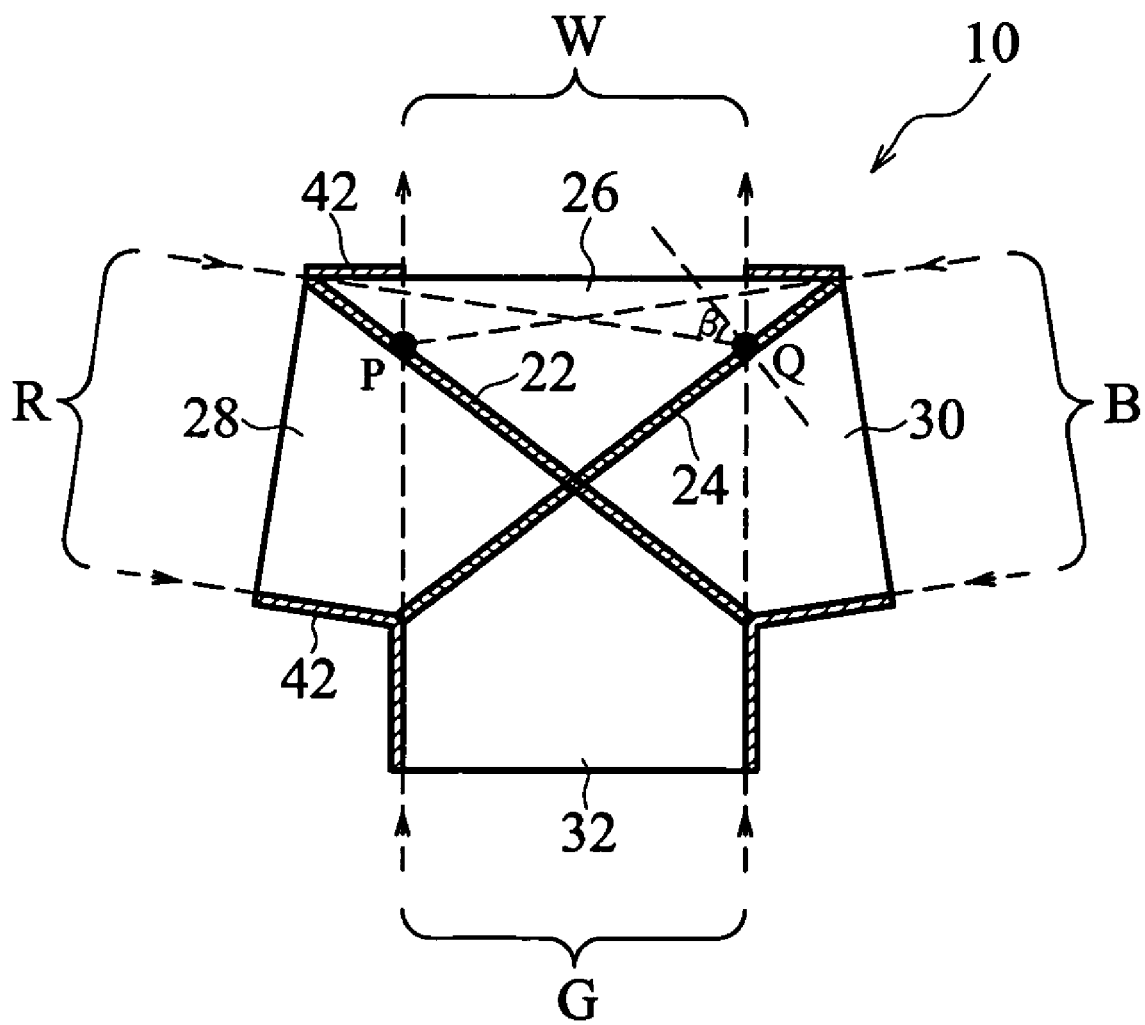
FIG. 5 is a schematic view of the optical prism assembly showing light paths for color combination.

FIG. 5 is a schematic view of the optical prism assembly 10 showing light paths for color combination. As shown in FIG. 5, red (R), blue (B), green (G) light components reflected by the digital light processing panels enter the optical prism assembly 10 from the left, right, and bottom sides thereof, incident at the prism blocks 28, 30, and 32, respectively, at a perpendicular angle. In the embodiment, the dichroic filter 22 can filter and reflect blue light components and transmit red and green light components. The dichroic filter 24 can filter and reflect red light components and transmit green and blue light components. Thus, after perpendicularly passing through the bounding surface of the prism block 28, the red light component penetrates the dichroic filter 22, is reflected by the dichroic filter 24, and transmits out of the base 26c of the isosceles triangular prism 26 in a perpendicular direction. After perpendicularly passing through the bounding surface of the prism block 30, the blue light component penetrates the dichroic filter 24, is reflected by the dichroic filter 22, and passes out of the base 26c of the isosceles triangular prism 26 at a perpendicular angle. After perpendicularly passing through the bounding surface of the prism block 32, the green light component passes through both dichroic filters 24 and 22 and transmits out of the base 26c of the isosceles triangular prism 26 at a perpendicular angle. Thus, the red, blue, and green light components are combined by the optical prism assembly 10.

Utilizing an isosceles triangular prism as a basic element of the present invention with two intersecting dichroic filter planes, a simple combination of prism blocks ensures the accordant light paths of each colored light in the optical prism assembly with each color perpendicularly entering and passing through the prism assembly.

Moreover, the invention limits the size of the base angles of the isosceles triangular prism to modulate the angle between two dichroic filter planes such that the incident angle of the colored light on the dichroic filter can be adjusted. Thus, the base angle β of the isosceles triangular prism is limited between 30° and 45° such that the angle between the dichroic filter planes can be reduced, thereby reducing the incident angle of the colored light on the dichroic filter, preventing shifts in polarization light spectrum of the dichroic filters. Thus, image accuracy and color after combination are enhanced.

Figure 6:
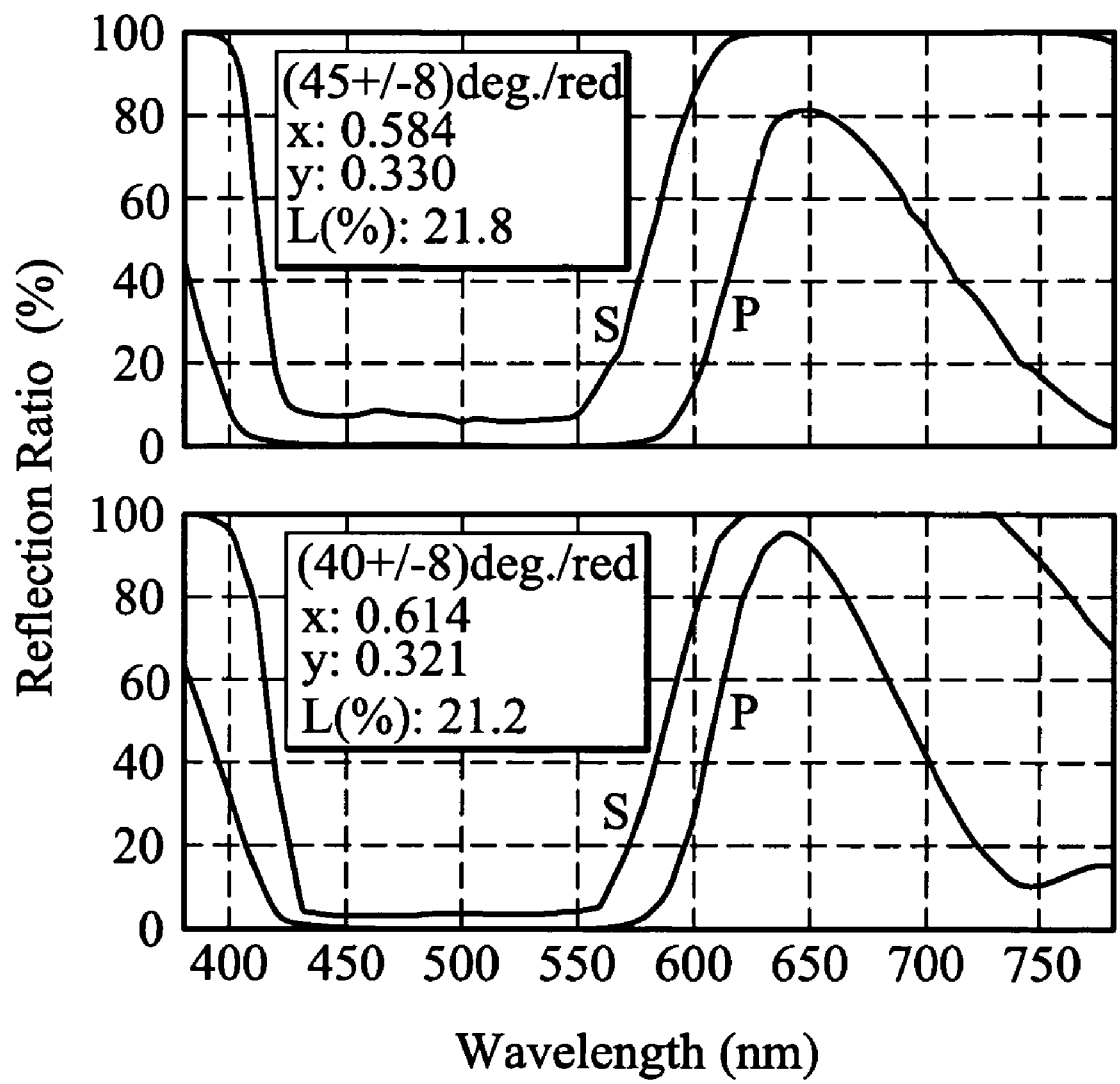
FIG. 6 is a polarization light spectrum diagram of different incident angles of red light.

FIG. 6 is a polarization light spectrum diagram of different incident angles of red light, presented as an example. The upper diagram is the spectrum of the conventional design when the red light has an incident angle of 45° at the dichroic filter in the shape of a cone with half-angle of 8°. The lower diagram is the spectrum of an embodiment of the present invention when the red light component enters at a smaller incident angle, for example 40°. Compared with the P-polarized waves of the invention, the P-polarized wave of the conventional design for the incident angle of 45° in the upper diagram is shifted to right with a lower reflection ratio (%). Thus, efficiency of the P-polarized light of the conventional design is reduced, with diminished shades of color and brightness of the red light. On the other hand, the S-polarized light of 45° case shifts left into the yellow color band region. It clearly shows that color contrast and saturation of the invention after combination of S- and P-polarized lights are improved.

Moreover, as shown in FIG. 5, the bounding surface of the optical prism assembly 10 without light penetration can be coated with light-absorbing material 42 to absorb stray light in the optical prism assembly 10.

While the invention has been described by way of example and in terms of preferred embodiment, it is to be understood that the invention is not limited thereto. To the contrary, it is intended to cover various modifications and similar arrangements. (as would be apparent to those skilled in the art). Therefore, the scope of the appended claims should be accorded the broadest interpretation so as to encompass all such modifications and similar arrangements.

What is claimed is:

1. An optical prism assembly for combining a plurality of colors of light processed digitally, comprising:
   a triangular main prism, comprising a first bounding surface and a second bounding surface having equal lengths, and having a base angle less than 45°;
   a first prism block, coupled to the first bounding surface;
   a second prism block, coupled to the second bounding surface;
   a third prism block, disposed between the first prism block and the second prism block; and
   a first filter and a second filter, each formed on the main prism and two adjacent bounding surfaces of each prism blocks, respectively; wherein the main prism is combined with each prism block to form a first filter continuous plane and a second filter continuous plane intersecting at an angle not equal to 90°.

2. The optical prism assembly as claimed in claim 1, wherein the first and second filter continuous planes intersect at an acute angle between 60° and 90°.

3. The optical prism assembly as claimed in claim 1, wherein the base angle of the triangular main prism is ranged between 30° and 45°.

4. The optical prism assembly as claimed in claim 1, wherein an incident angle of the colored light at the filters is ranged between 30° and 45°.

5. The optical prism assembly as claimed in claim 1, wherein the first and the second filter each comprise a dichroic filter.

6. The optical prism assembly as claimed in claim 1, further comprising a first digital light processing panel parallel to and facing the first prism block.

7. The optical prism assembly as claimed in claim 1, further comprising a second digital light processing panel parallel to and facing the second prism block.

8. The optical prism assembly as claimed in claim 1, further comprising a third digital light processing panel parallel to and facing the third prism block.

9. The optical prism assembly as claimed in claim 1, wherein the first prism block and the second prism block have the same shape and size.

10. The optical prism assembly as claimed in claim 1, wherein the first prism block comprises a quadrangular prism.

11. The optical prism assembly as claimed in claim 1, wherein the second prism block comprises a quadrangular prism.

12. The optical prism assembly as claimed in claim 1, wherein the third prism block comprises a pentagonal prism.

13. The optical prism assembly as claimed in claim 1, further comprising a light absorbing material, distributed on a bounding surface of the optical prism assembly where the colored light has not been transmitted.

14. The optical prism assembly as claimed in claim 1, wherein the colored light comprises a first colored light, a second colored light, and a third colored light, wherein the first filter reflects the first colored light and transmits other light, and the second filter reflects the second colored light and transmits other light.

15. The optical prism assembly as claimed in claim 6, wherein each of the base angles of the triangular main prism is defined as $\beta$; the angle between two bounding surfaces of the first prism block, connected to the triangular main prism and the third prism block, is defined as $2\beta$, and the angle between two bounding surfaces of the first prism block, connected to the triangular main prism and facing the first digital light processing panel, is defined as $\pi-3\beta$.

16. The optical prism assembly as claimed in claim 7, wherein each of the base angles of the triangular main prism is defined as $\beta$; the angle between two bounding surfaces of the second prism block, connected to the triangular main prism and the third prism block, is defined as $2\beta$, and the angle between two bounding surfaces of the second prism block, connected to the triangular main prism and facing the second digital light processing panel, is defined as $\pi-3\beta$.

17. An optical prism assembly for combining a plurality of colors of light processed digitally, comprising:
   a triangular main prism, comprising a first bounding surface and a second bounding surface having equal lengths, and having a base angle less than 45°;
   a first prism block, coupled to the first bounding surface;
   a second prism block, coupled to the second bounding surface;
   a third prism block, disposed between the first prism block and the second prism block;
   a first filter, disposed between the first bounding surface and the first prism block and between the second prism block and the third prism block; and
   a second filter, disposed between the second bounding surface and the first prism block and between the second prism block and the third prism block.

18. The optical prism assembly as claimed in claim 17, wherein the base angle of the main prism exceeds 30°.

19. The optical prism assembly as claimed in claim 17, wherein a connecting surface between the third prism block and the first prism block is parallel to the second bounding surface, and a connecting surface between the third prism block and the second prism block is parallel to the first bounding surface.

20. The optical prism assembly as claimed in claim 19, wherein the connecting surface between the third prism block and the first prism block forms a continuous plane, and the connecting surface between the third prism block and the second prism block forms a continuous plane.

21. The optical prism assembly as claimed in claim 17, further comprising a light absorbing material, distributed on a bounding surface of the optical prism assembly where the colored light has not been transmitted.

22. An optical prism assembly for combining a plurality of colors of light processed digitally, comprising:
   a triangular main prism, comprising a first bounding surface and a second bounding surface having equal lengths;
   a first prism block, coupled to the first bounding surface;
   a second prism block, coupled to the second bounding surface;
   a third prism block, disposed between the first prism block and the second prism block;

a first filter, disposed between the first bounding surface and the first prism block and between the second prism block and the third prism block; and a second filter, disposed between the second bounding surface and the first prism block and between the second prism block and the third prism block; and a light absorbing material, distributed on a bounding surface of the optical prism assembly where the colored light has not been transmitted.

* * * * *